United States Patent
Oota et al.

(10) Patent No.: US 10,042,059 B2
(45) Date of Patent: Aug. 7, 2018

(54) RADIATION DETECTOR USING GAS AMPLIFICATION, MANUFACTURING METHOD FOR RADIATION DETECTOR USING GAS AMPLIFICATION, AND METHOD FOR DETECTING RADIATION BY RADIATION DETECTOR USING GAS AMPLIFICATION

(71) Applicant: DAI NIPPON PRINTING CO., LTD., Tokyo (JP)

(72) Inventors: Kohei Oota, Tokyo (JP); Tomohisa Motomura, Tokyo (JP); Motonori Oono, Tokyo (JP)

(73) Assignee: DAI NIPPON PRINTING CO., LTD., Tokyo (JP)

( * ) Notice: Subject to any disclaimer, the term of this patent is extended or adjusted under 35 U.S.C. 154(b) by 0 days.

(21) Appl. No.: 15/730,615

(22) Filed: Oct. 11, 2017

(65) Prior Publication Data
US 2018/0081069 A1   Mar. 22, 2018

Related U.S. Application Data
(63) Continuation of application No. PCT/JP2016/001990, filed on Apr. 12, 2016.

(30) Foreign Application Priority Data

Apr. 13, 2015 (JP) .................... 2015-081578
Mar. 31, 2016 (JP) .................... 2016-070703

(51) Int. Cl.
*G01T 1/185* (2006.01)
*G01T 7/00* (2006.01)

(52) U.S. Cl.
CPC ............ *G01T 1/185* (2013.01); *G01T 7/00* (2013.01)

(58) Field of Classification Search
CPC ...................... G01T 1/185; G01T 7/00
See application file for complete search history.

(56) References Cited

U.S. PATENT DOCUMENTS

| | | | | |
|---|---|---|---|---|
| 5,742,061 A | * | 4/1998 | Lemonnier | H01J 47/06 250/374 |
| 8,207,505 B2 | * | 6/2012 | Motomura | G01T 1/185 250/385.1 |
| 2002/0134945 A1 | * | 9/2002 | Tanimori | G01T 1/185 250/385.1 |

FOREIGN PATENT DOCUMENTS

| | | |
|---|---|---|
| JP | 2002-006047 A | 1/2002 |
| JP | 2002-090465 A | 3/2002 |

(Continued)

OTHER PUBLICATIONS

May 24, 2016 International Search Report issued in International Patent Application No. PCT/JP2016/001990.

*Primary Examiner* — Christine S Kim
(74) *Attorney, Agent, or Firm* — Oliff PLC (57) ABSTRACT

A radiation detector using gas amplification, includes: an insulator having a first surface and a second surface positioned at a back surface side of the first surface; a first electrode layer that is provided on the first surface of the insulator and has a circular opening portion; a pixel electrode positioned inside the opening portion; a second electrode layer provided on the second surface of the insulator; and a via hole conductor that has one end surface thereof bonded to the second electrode layer through the interior of the insulator and has the other end surface thereof bonded to the pixel electrode, in which at least a part of the other end surface side of the via hole conductor exhibits a column or truncated cone shape and an outer diameter of the via hole conductor becomes smallest at the one end surface.

18 Claims, 6 Drawing Sheets

(56) References Cited

FOREIGN PATENT DOCUMENTS

| JP | 2007-078653 A | 3/2007 |
| JP | 2009-224069 A | 10/2009 |
| JP | 2012-013483 A | 1/2012 |
| JP | 2013-011623 A | 1/2013 |

* cited by examiner

RADIATION DETECTOR USING GAS AMPLIFICATION, MANUFACTURING METHOD FOR RADIATION DETECTOR USING GAS AMPLIFICATION, AND METHOD FOR DETECTING RADIATION BY RADIATION DETECTOR USING GAS AMPLIFICATION

CROSS-REFERENCE TO RELATED APPLICATIONS

This application is a continuation of prior International Application No. PCT/JP2016/001990, filed on Apr. 12, 2016 which is based upon and claims the benefit of priority from Japanese Patent Applications No. 2015-081578 filed on Apr. 13, 2015, and No. 2016-070703 filed on Mar. 31, 2016; the entire contents of all of which are incorporated herein by reference.

FIELD

The present invention relates to a radiation detector using gas amplification by a pixel-type electrode, a manufacturing method of a radiation detector using gas amplification, and a method of detecting radiation by a radiation detector using gas amplification.

BACKGROUND

As a radiation detector using gas amplification, a pixel-type radiation detector has been used conventionally. This radiation detector employs a constitution such that a strip-shaped cathode electrode is formed on a front surface of a double-sided printed-circuit board, for example, an anode strip is formed on a back surface thereof, opening portions are formed in the strip-shaped cathode electrode at regular intervals, and a column-shaped anode electrode connected to the anode strip on the back, namely a pixel electrode is formed at the center of each of the opening portions.

Incidentally, the above-described radiation detector is disposed in a mixed gas of argon and methane, for example. Further, a voltage of +600 V, for example, has been applied to the above-described pixel electrodes.

In the above-described radiation detector, when predetermined radiation enters the aforementioned detector, the aforementioned gas is ionized to generate electrons and these electrons cause electron avalanche amplification by a large voltage applied between the above-described strip-shaped cathode electrode and the above-described pixel electrode and a strong electric field generated due to a shape (shape anisotropy) as a point electrode of the above-described pixel electrode. On the other hand, positive ions generated by the aforementioned electron avalanche amplification drill toward the aforementioned strip-shaped cathode electrode around the ions.

As a result, the strip-shaped cathode electrode and the pixel electrode to be a target are each charged with the positive ion and the electron. Thus, detection of the positions of the strip-shaped cathode electrode and the pixel electrode in which electric charges are generated in this manner makes it possible to specify an incident position of radiation in the detector, resulting in that radiation detection is enabled (Patent Document 1).

In the above-described radiation detector, when the voltage to be applied to the pixel electrode is increased, the intensity of the electric field to be generated also increases and the above-described electron avalanche amplification becomes significant, and thus an amount of the electric charges to be generated in the strip-shaped cathode electrode and the pixel electrode increases and sensitivity (a gas amplification factor) of radiation improves. On the other hand, when the voltage to be applied to the pixel electrode is increased, by abnormal discharge caused by the shape of a via hole conductor bonded to the pixel electrode, the pixel electrode and the via hole conductor break in some cases. Further, when the voltage to be applied to the pixel electrode is reduced, the above-described abnormal discharge decreases, but the degree of the above-described electron avalanche amplification also decreases and detection sensitivity of radiation decreases.

From such a viewpoint, narrowing the via hole conductor bonded to the pixel electrode and improving the intensity of the electric field to be generated have been attempted in place of increasing the voltage to be applied to the pixel electrode. However, the above-described via hole conductor is formed by performing via filling plating inside a through hole formed in the printed-circuit board, and thus narrowing the aforementioned through hole is also required in order to narrow the via hole conductor. On the other hand, narrowing the through hole makes it impossible to uniformly perform the via filling plating inside the aforementioned through hole and to form an uniform via hole conductor, resulting in that problems such as abnormal discharge, dielectric breakdown, and sensitivity variation (risk of an increase in low-sensitivity pixel) occur in the aforementioned pixel electrode. Therefore, narrowing the aforementioned via hole conductor relays on its manufacturing method to be limited naturally (Patent Document 2).

In place of increasing the voltage to be applied to the pixel electrode, attaching a GEM (Gas Electron Multiplier) to the radiation detector has also been attempted similarly, but there has also been a problem of failing to perform radiation detection stably because of occurrence of variations in amplification caused by complicated installation of the GEM.

As a result, there has been a problem of failing to sufficiently improve the sensitivity (gas amplification factor) of the above-described pixel-type radiation detector at present.

PRIOR ART DOCUMENT

Patent Document

[Patent Document 1] Japanese Laid-open Patent Publication No. 2002-006047
[Patent Document 2] Japanese Laid-open Patent Publication No. 2012-013483

SUMMARY OF THE INVENTION

Problems to be Solved by the Invention

An object of the present invention is to provide a radiation detector using gas amplification by a pixel-type electrode, which has sufficiently high sensitivity (gas amplification factor), a manufacturing method of a radiation detector using gas amplification, and a method of detecting radiation by a radiation detector using gas amplification.

Means of Solving the Problems

In order to achieve the above-described object, the present invention is a radiation detector using gas amplification including: an insulator having a first surface and a second surface positioned at a back surface side of the first surface; a first electrode layer that is provided on the first surface of the insulator and has a circular opening portion; a pixel electrode positioned inside the opening portion; a second electrode layer provided on the second surface of the insulator; and a via hole conductor that has one end surface thereof bonded to the second electrode layer through the interior of the insulator and has the other end surface thereof bonded to the pixel electrode, in which at least a part of the other end surface side of the via hole conductor exhibits a column or truncated cone shape and an outer diameter of the via hole conductor becomes smallest at the one end surface.

Further, the present invention is a manufacturing method of a radiation detector using gas amplification being a manufacturing method of a radiation detector using gas amplification including: an insulator having a first surface and a second surface positioned at a back surface side of the first surface; a first electrode layer that is provided on the first surface of the insulator and has a circular opening portion; a pixel electrode positioned inside the opening portion; a second electrode layer provided on the second surface of the insulator; and a via hole conductor that has one end surface thereof bonded to the second electrode layer through the interior of the insulator and has the other end surface thereof bonded to the pixel electrode, the method including: a first forming step of forming a through hole corresponding to a shape of the via hole conductor in the interior of the insulator; and a second forming step of forming the via hole conductor by performing via filling plating to fill the through hole, in which at least a part of the other end surface side of the via hole conductor obtained by the first and second forming steps exhibits a column or truncated cone shape and an outer diameter of the via hole conductor becomes smallest at the one end surface.

Further, the present invention is a method of detecting radiation by a radiation detector using gas amplification being a method of detecting radiation by a radiation detector using gas amplification including: an insulator having a first surface and a second surface positioned at a back surface side of the first surface; a first electrode layer that is provided on the first surface of the insulator and has a circular opening portion; a pixel electrode positioned inside the opening portion; a second electrode layer provided on the second surface of the insulator; and a via hole conductor that has one end surface thereof bonded to the second electrode layer through the interior of the insulator and has the other end surface thereof bonded to the pixel electrode, in which at least a part of the other end surface side of the via hole conductor exhibits a column or truncated cone shape and an outer diameter of the via hole conductor becomes smallest at the one end surface.

The present inventors conducted an earnest examination in order to achieve the object of the present invention. As a result, as for the conventional abnormal discharge depending on the shape of the via hole conductor caused when a voltage to be applied to the pixel electrode is increased, it was found out that the via hole conductor has a column shape, and at the time of manufacture of the via hole conductor, a through hole is formed in the interior of the insulator, and when the via hole conductor is formed by performing via filling plating inside the through hole, voids occur inside the via hole conductor and in a heating step and a gas charging step in a manufacturing step after the plating, the plating is torn due to the existence of voids or an anode electrode is deformed on top of the voids, and thereby the sensitivity (gas amplification factor) of the radiation detector no longer becomes stable and the abnormal discharge becomes likely to occur.

Accordingly, the present inventors further conducted an earnest examination in order to prevent occurrence of voids inside the via hole conductor. As a result, they found out that it is constituted so that at least a part of the other end surface side of the via hole conductor exhibits a column or truncated cone shape and the outer diameter of the via hole conductor becomes smallest at the one end surface, and thereby a plating solution becomes likely to circulate in a via hole because an edge of a via wall and the surface is positioned backward relative to an edge of the via wall and a bottom, and it is possible to suppress occurrence of voids without filling the via even when the plating grows at the edge of the via wall and the surface, and found out that it is possible to stabilize the amplification factor and suppress the abnormal discharge by suppressing electrode shape abnormality caused by the existence of voids.

As a result, the radiation detector using gas amplification of the present invention (to be sometimes referred to as a "radiation detector" hereinafter) is capable of suppressing the abnormal discharge depending on the shape of the via hole conductor, so that it is possible to increase the voltage to be applied to the via hole conductor and improve the sensitivity (gas amplification factor) of the radiation detector. Furthermore, it is also possible to suppress the variation in sensitivity (gas amplification factor) depending on the shape of the via hole conductor, so that it is possible to improve detection accuracy.

Further, in the present invention, at least a part of the other end surface side of the via hole conductor exhibits a column or truncated cone shape and the outer diameter of the via hole conductor becomes smallest at the one end surface. Thereby, the distance between the first electrode layer and the one end surface of the via hole conductor is also increased. Accordingly, the electric field between the first electrode layer and the one end surface of the via hole conductor becomes weak, resulting in that it becomes possible to concentrate the electric field on the other end surface of the pixel electrode.

Incidentally, the "truncated cone shape" described above means the shape in which of the via hole conductor, the outer diameter of, for example, the other end surface side is larger than that of the one end surface side.

In the present invention, in the case where the outer diameter of the other end surface of the via hole conductor is D1 and the outer diameter of the one end surface of the via hole conductor is d1, D1/d1 can be made to fail within a range of 1.22 or more and 1.85 or less. In this case, it becomes possible to suppress occurrence of voids inside the via hole conductor, suppress discharge caused by existence of these voids and further abnormal discharge depending on the shape of the via hole conductor, and sufficiently improve the sensitivity (gas amplification factor) of the radiation detector by increasing the voltage to be applied to the pixel electrode, which is the above-described function effect of the present invention.

Further, the insulator composing the radiation detector is formed of polyimide and a glass cloth, for example, and its relative permittivity can be 4.2 to 4.4 (4.2 or more and 4.4 or less), and further can be 4.3. In this case, the insulating property of the insulator improves, and even when the first electrode layer and the second electrode layer are formed on both main surfaces of the insulator and a relatively large voltage is applied between these electrode layers, it becomes possible to suppress discharge between these electrodes to sufficiently improve the sensitivity (gas amplification factor) of the radiation detector.

Incidentally, the relative permittivity of the insulator composing the radiation detector is preferably set to 3.0 to 4.9 (3.0 or more and 4.9 or less), more preferably set to 4.2 to 4.4 (4.2 or more and 4.4 or less), and further suitably set to 4.3.

Effect of the Invention

As explained above, according to the present invention, it is possible to provide a radiation detector using gas amplification by a pixel electrode, which has sufficiently high sensitivity (gas amplification factor).

MODE FOR CARRYING OUT THE INVENTION

Hereinafter, there will be explained features and other advantages of the present invention based on modes for carrying out the invention.

<Radiation Detector>

Figure 1:
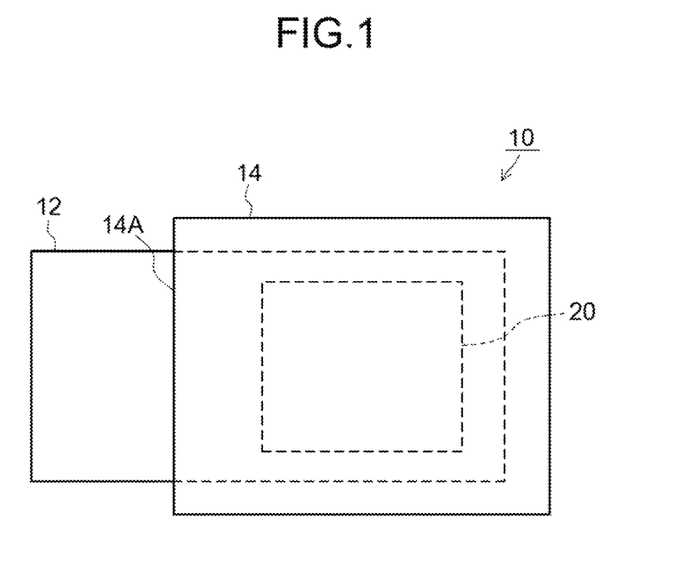
FIG. 1 It is a view schematically illustrating a composition of a radiation detector using gas amplification in this embodiment.
Figure 2:
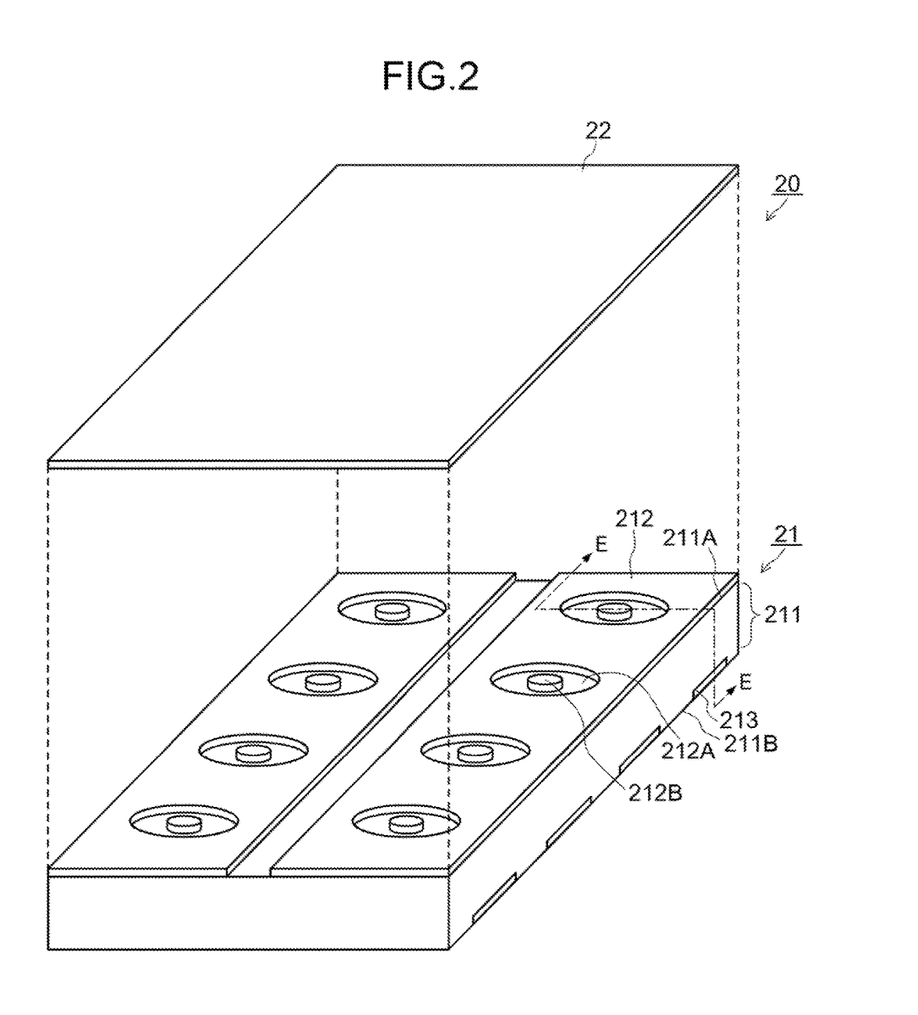
FIG. 2 It is a perspective view illustrating a pixel-type radiation detector (radiation detector main body) illustrated in FIG. 1 in an enlarged manner.

FIG. 1 is a view schematically illustrating a composition of a radiation detector in this embodiment (a view viewed from a plane direction), and FIG. 2 is a perspective view illustrating a pixel-type radiation detector (radiation detector main body) illustrated in FIG. 1 in an enlarged manner.

Figure 3:
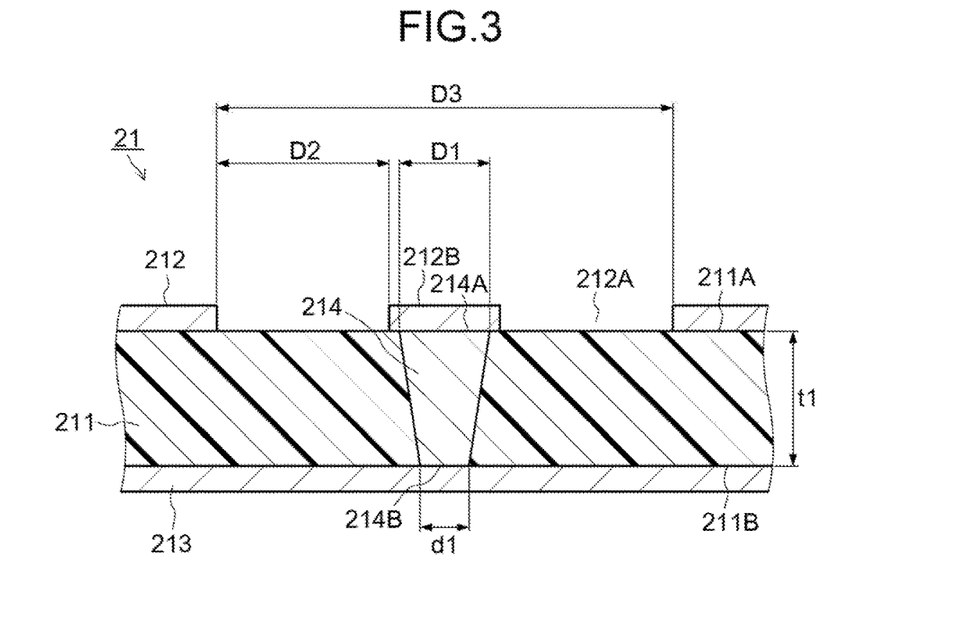
FIG. 3 It is a cross-sectional view illustrating a pixel electrode periphery portion (E-E cross-section in FIG. 2) of the pixel-type radiation detector illustrated in FIG. 2 in an enlarged manner.

Further, FIG. 3 is a cross-sectional view (E-E cross-sectional view) illustrating a pixel electrode periphery portion of the pixel-type radiation detector illustrated in FIG. 2 in an enlarged manner.

As illustrated in FIG. 1, a radiation detector 10 in this embodiment includes: a pixel-type radiation detector (radiation detector main body) 20; a wiring board 12; a gas filled chamber 14 including a feed-through portion 14A; and so on. On the wiring board 12, a current detection circuit, and so on are formed. The pixel-type radiation detector 20 is mounted on the wiring board 12. The pixel-type radiation detector 20 on the wiring board 12 is housed in the gas filled chamber 14 together with a mixed gas of argon and methane, for example. Incidentally, a part of the wiring board 12 is exposed outside from the gas filled chamber 14 via the feed-through portion 14A as illustrated in FIG. 1. As illustrated in FIG. 2, the pixel-type radiation detector 20 includes a detection panel 21 and an electrode plate 22 provided above the detection panel 21 so as to face thereto.

As illustrated in FIG. 2 and FIG. 3, the detection panel 21 is provided with an insulator 211, first electrode layers 212, second electrode layers 213, pixel electrodes (pixel-type electrodes) 212B, and via hole conductors 214. The insulator 211 has a first surface (first main surface) 211A and a second surface (second main surface) 211B positioned at a back surface side of the first surface 211A. The first electrode layer 212 is provided on the first surface 211A of the insulator 211 and has circular opening portions 212A. The first electrode layer 212 is a cathode electrode layer disposed in a strip shape. On the other hand, the second electrode layer 213 is provided on the second surface 211B of the insulator 211. The second electrode layer 213 is an anode electrode layer disposed in a strip shape so as to extend in a direction to perpendicularly intersect with the first electrode layer 212. The pixel electrode 212B is an anode electrode provided inside (in a center portion of) the opening portion 212A on the first surface 211A of the insulator 211. The via hole conductor 214 has one end surface (a lower end surface in FIG. 2, FIG. 3) 214B thereof bonded to the second electrode layer 213 through the interior of the insulator 211. Further, the via hole conductor 214 has the other end surface (an upper end surface in FIG. 2, FIG. 3) 214A thereof bonded to the pixel electrode 212B positioned inside the opening portion 212A at the first surface 211A side of the insulator 211. That is, the via hole conductor 214 interlayer connects the pixel electrode 212B and the second electrode layer 213 through the interior of the insulator 211.

As illustrated in FIG. 3, at least a part of the other end surface side (upper end surface) 214A of the via hole conductor 214 exhibits a column or truncated cone shape and an outer diameter of the via hole conductor 214 becomes smallest at the one end surface (lower end surface) 214B. Concretely, in the example illustrated in FIG. 3, the via hole conductor 214 is formed in a truncated cone shape (inverted truncated cone shape) as a whole including a part of the other end surface (upper end surface) 214A side and a part of the one end surface (lower end surface) 214B side. In other words, of the via hole conductor 214, the shape of a cross section along a thickness direction of the insulator 211 (to be sometimes referred to as a "vertical direction cross section" hereinafter) is formed in an inverted trapezoid. Such a shape of the via hole conductor 214, when a through hole is formed in the interior of the insulator 211 at the time of manufacture and via filling plating is performed inside the through hole to form the via hole conductor 214, makes it possible to suppress occurrence of voids inside the via hole conductor 214 and suppress discharge caused by existence of the voids and further abnormal discharge depending on the shape of the via hole conductor 214.

As a result, the radiation detector 10 is capable of suppressing the abnormal discharge depending on the shape of the via hole conductor 214, and thus it is possible to increase the voltage to be applied to the via hole conductor 214 and improve the sensitivity (gas amplification factor) of the radiation detector 10. Here, the above-described via filling plating is the resultant obtained by adding an inhibitor to suppress plating growth and an accelerating agent to accelerate plating growth to a copper sulfate plating bath. That is, the via filling plating is a method of preferentially precipitating copper inside a via hole while applying the function that the inhibitor has a difficulty in being adsorbed to the inside of the via hole and is easily adsorbed to a board surface in accordance with a material diffusion law. More concretely, the accelerating agent is first uniformly adsorbed to a bottom surface and a side surface of the via hole, and the board surface. Subsequently, a surface area inside the via hole decreases as the plating grows. As above, the accelerating agent inside the via hole thickens, and thereby a forming rate of the plating inside the via hole becomes faster than that of the plating on board surface. As described already, the via filling plating can fill the inside of the via hole with copper by both effects of the inhibitor and the accelerating agent.

Further, in this embodiment, since the via hole conductor 214 is formed in an inverted truncated cone shape as described above, the distance between the first electrode layer 212 and the one end surface (lower end surface) 214B of the via hole conductor 214 also increases. Thus, it is possible to suppress also the discharge (abnormal discharge) between the first electrode layer 212 and the one end surface (lower end surface) 214B of the via hole conductor 214.

Incidentally, the "inverted truncated cone shape" expressed as the shape of the via hole conductor 214 means a state where of the via hole conductor 214, an outer diameter D1 of the other end surface (upper end surface) 214A is larger than an outer diameter d1 of the one end surface (lower end surface) 214B as illustrated in FIG. 3. A taper angle at the one end surface (lower end surface) 214B side of the inverted truncated cone shaped via hole conductor 214 (an exterior angle corresponding to an interior angle formed by the bottom surface and the side surface of the via hole conductor 214) varies according to the depth of the via hole conductor 214. As long as D1/d1 is 1.22 to 1.85 (1.22 or more and 1.85 or less), at least the upper limit angle of the above-described taper angle is desired to be 87.5°. When this taper angle becomes, for example, 90°, the side surface of the via hole conductor 214 becomes straight, and there is a risk in this case that the plating does not adhere well or voids occur. Concretely, the outer diameter d1 of the one end surface (lower end surface) 214B of the via hole conductor 214 is formed within a range of 10 μm to 60 μm, for example, correspondingly, the outer diameter D1 of the other end surface (upper end surface) 214A of the via hole conductor 214 is formed so as to satisfy the above-described ratio (1.22 to 1.85), and further the depth of the via hole conductor 214 is formed within a range of 5 μm to 400 μm, for example, thereby making it relatively easier to suppress the upper limit angle of the above-described taper angle to 87.5° or less.

In the radiation detector 10 in this embodiment, as described above, D1/d1, which is the ratio of the outer diameter D1 of the other end surface 214A of the via hole conductor 214 to the outer diameter d1 of the one end surface 214B of the via hole conductor 214, is preferred to be 1.22 to 1.85 (1.22 or more and 1.85 or less). In this case, it becomes possible to suppress occurrence of voids inside the via hole conductor 214, suppress discharge caused by existence of these voids and further abnormal discharge depending on the shape of the via hole conductor 214, and sufficiently improve the sensitivity (gas amplification factor) of the radiation detector 10 by increasing the voltage to be applied to the via hole conductor 214, which is the above-described function effect of this embodiment. Here, when D1/d1 exceeds 1.85, the angle of the side surface of the via hole conductor 214 becomes too acute, resulting in that the diameter of the one end surface (lower end surface) 214B of the via hole conductor 214 decreases and a connection area with the second electrode layer (inner conductive layer) 213 decreases. This increases the possibility of connection failure to occur at the one end surface 214B of the via hole conductor 214. Further, when D1/d1 exceeds 1.85 similarly, the angle of the side surface of the via hole conductor 214 becomes too acute, and thus, in order to secure a sufficient connection area of the one end surface 214B of the via hole conductor 214 and the second electrode layer (inner conductive layer) 213, it is necessary to reduce the depth of the via hole conductor 214. The reduction in depth of the via hole conductor 214 means that in the radiation detector 10, an anode strip line and a cathode strip line that intersect with each other approach. Such an approach leads to dispersion of the electric field concentrating in an electrode portion, and under the same potential difference condition, the gas amplification factor decreases. Even if securing the equivalent gas amplification factor is tried by increasing the potential difference, the possibility of occurrence of discharge increases to make stable operation of the radiation detector 10 difficult. On the other hand, when D1/d1 is less than 1.22, the shape of the side surface of the via hole conductor 214 becomes too straight with less taper and the plating solution does not circulate well, resulting in that there is a risk that the connection failure occurs between the one end surface 214B of the via hole conductor 214 and the second electrode layer (inner conductive layer) 213 or the plating at the other end surface 214A side of the via hole conductor 214 or the like grows earlier than the plating growth inside the via hole conductor 214 to form voids.

In the case where a thickness t1 of the insulator 211 is set to 75 μm as one example, the outer diameter D1 of the other end surface (upper end surface) 214A of the via hole conductor 214 can be 55 μm to 65 μm, and the outer diameter d1 of the one end surface (lower end surface) 214B of the via hole conductor 214 can be 35 μm to 45 μm.

Incidentally, a diameter D3 of the opening portion 212A can be 80 μm to 300 μm, and a distance D2 between a side surface (outer peripheral surface) of a conductive body pattern 212B positioned on the other end surface (upper end surface) 214A of the via hole conductor 214 and a side surface (inner peripheral surface) of the opening portion 212A of the first electrode layer 212 can be 20 μm to 130 μm.

Further, in this embodiment, a relative permittivity of the insulator 211 composing the radiation detector 10 is preferably set to 3.0 to 4.9 (3.0 or more and 4.9 or less), more preferably set to 4.2 to 4.4 (4.2 or more and 4.4 or less), and further suitably set to 4.3. In this case, the insulating property of the insulator 211 improves, and even when a relatively large voltage is applied between the first electrode layer 212 and the second electrode layer 213 that are formed on the main surface 211A and the back surface 211B of the insulator 211, it becomes possible to suppress discharge between these electrodes to sufficiently improve the sensitivity (gas amplification factor) of the radiation detector 10.

Figure 4:
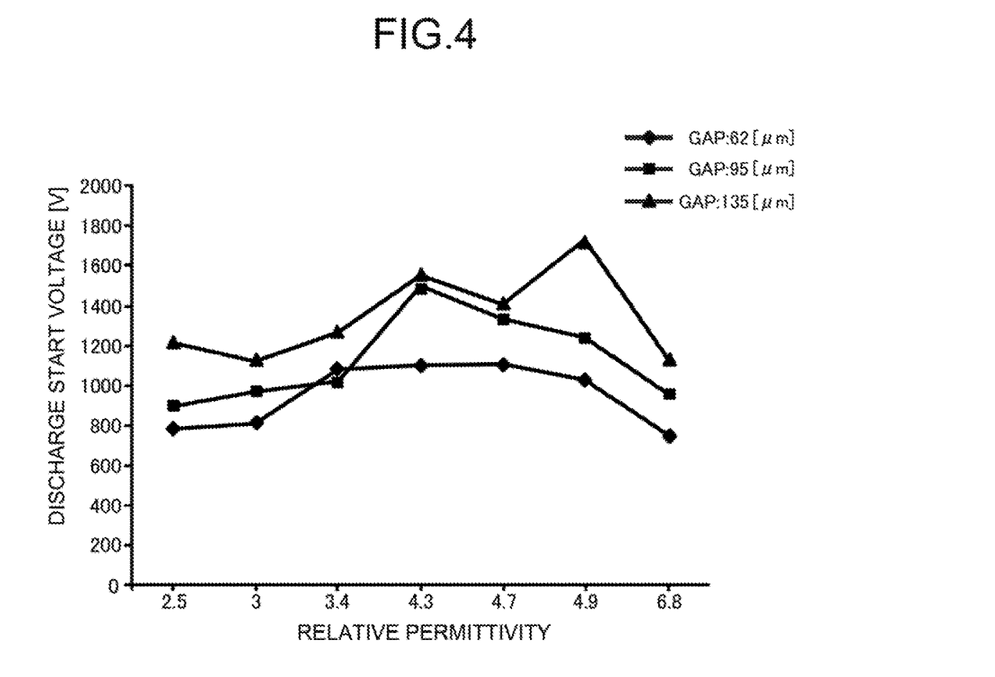
FIG. 4 It is a chart illustrating the relationship between a relative permittivity of an insulator of the pixel electrode periphery portion illustrated in FIG. 2 and a discharge start voltage by a voltage application test.

Here, FIG. 4 illustrates the relationship between the relative permittivity of the insulator 211 and a discharge start voltage [V] by a voltage application test. FIG. 4 is a test result to which a plurality of types of radiation detectors composed by combining three types of the above-described distance D2 (GAP) and seven types of the insulator 211 different in relative permittivity individually are applied. Incidentally, in FIG. 4, the number of samples of the radiation detector (number of test detectors) in each one combination is three. As illustrated in FIG. 4, in the case where D2 (GAP) is set to 95 μm and the relative permittivity of the insulator 211 is set to 4.2 to 4.4 (4.3), for example, the discharge start voltage is high and a good result is obtained.

Further, the insulator 211 having a relative permittivity of 4.2 to 4.4 can be obtained by a mixture of polyimide and a glass cloth, for example.

Incidentally, the first electrode layer 212 and the second electrode layer 213 can be formed of conductive members such as copper, gold, silver, nickel, and aluminum.

Figure 5:
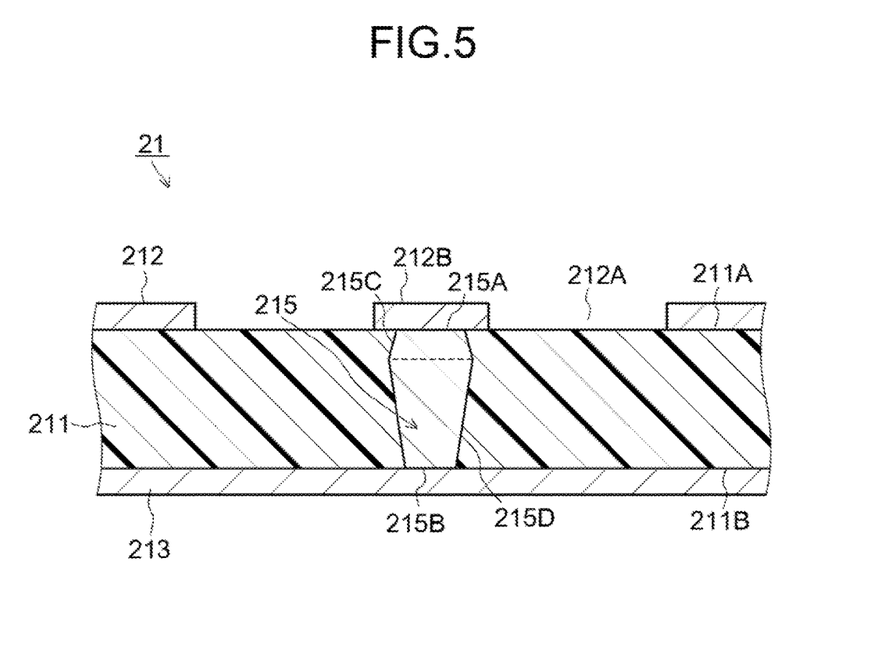
FIG. 5 It is a cross-sectional view illustrating a pixel electrode periphery portion of another pixel-type radiation detector having a structure partially different from the pixel-type radiation detector illustrated in FIG. 3 in an enlarged manner.

FIG. 5 is a modified example of this embodiment. As illustrated in FIG. 5, at least a part of the other end surface (upper end surface) 215A side of a via hole conductor 215 exhibits a column or truncated cone shape and an outer diameter of one end surface (lower end surface) 215B out of the entire outer diameter of the via hole conductor 215 is smallest. However, the example illustrated in FIG. 5 is different from the example illustrated in FIG. 3, in which of the via hole conductor 215, a part 215C of the other end surface (upper end surface) 215A side exhibits a truncated cone shape, while a part 215D of the one end surface (lower end surface) 215B side is formed in ail inverted truncated cone shape. It is also possible to apply the via hole conductor 215 having such a shape to the radiation detector in this embodiment.

Figure 6:
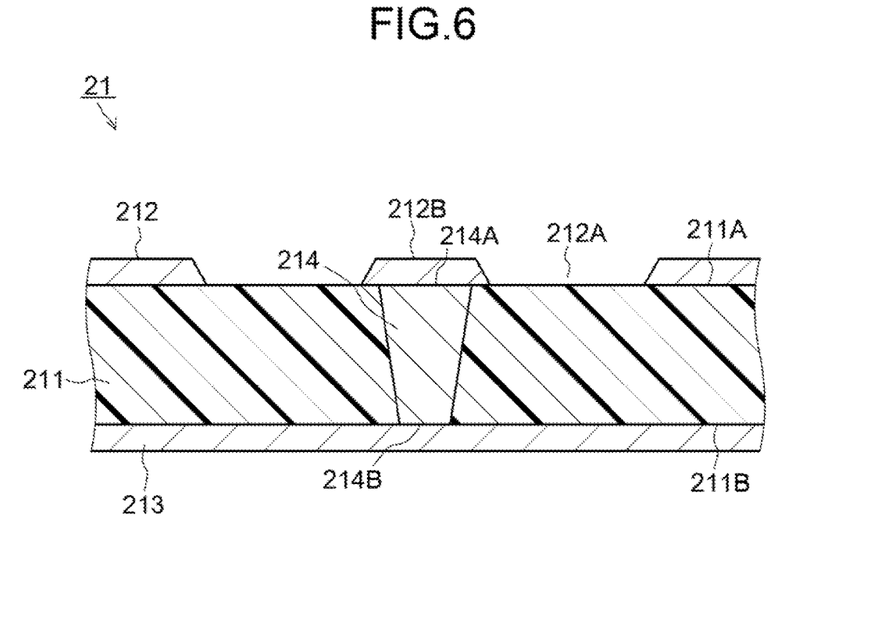
FIG. 6 It is a cross-sectional view illustrating a pixel electrode periphery portion of another pixel-type radiation detector having a structure partially different from the pixel-type radiation detectors illustrated in FIG. 3 and FIG. 5 in an enlarged manner.
Figure 7:
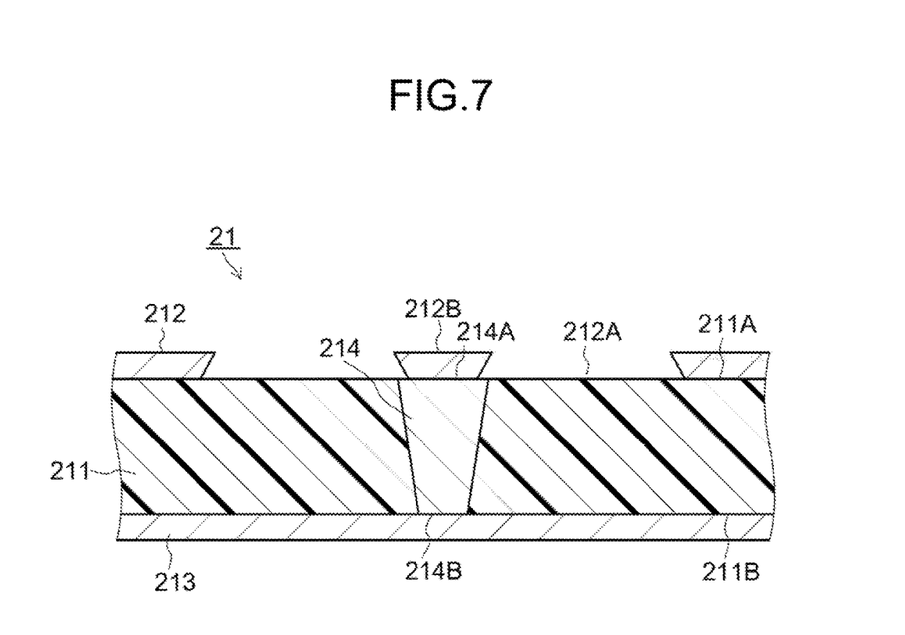
FIG. 7 It is a cross-sectional view illustrating a pixel electrode periphery portion of another pixel-type radiation detector having a structure partially different from the pixel-type radiation detectors illustrated in FIG. 3, FIG. 5, and FIG. 6 in an enlarged manner.

FIG. 6 and FIG. 7 are other modified examples of this embodiment. FIG. 6 and FIG. 7 each are a cross-sectional view illustrating the pixel electrode periphery portion of the pixel-type radiation detector illustrated in FIG. 2 as an example (E-E cross section in FIG. 2) in an enlarged manner. In the example of FIG. 6, a side surface (inner peripheral surface) of the first electrode layer 212 and a side surface (outer peripheral surface) of the pixel electrode 212B are formed in a tapered shape so that a distance therebetween gradually increases toward one end surface (the upper end surface) 211A side of the insulator 211. On the other hand, in the example of FIG. 7, the side surface (inner peripheral surface) of the first electrode layer 212 and the side surface (outer peripheral surface) of the pixel electrode 212B are formed in a tapered shape so that a distance therebetween gradually decreases toward the one end surface (upper end surface) 211A side of the insulator 211.

However, as long as the via hole conductor 214 exhibits an inverted truncated cone shape, also in the aspects illustrated in FIG. 6 and FIG. 7, it is possible to suppress, when forming the via hole conductor 214, occurrence of voids inside the via hole conductor 214, and suppress discharge caused by existence of these voids and further abnormal discharge depending on the shape of the via hole conductor 214, which is the function effect of this embodiment. As a result, the radiation detector 10 is capable of suppressing the abnormal discharge depending on the shape of the via hole conductor 214, so that it is possible to increase the voltage to be applied to the via hole conductor 214 and improve the sensitivity (gas amplification factor) of the radiation detector 10.

In more detailed description, in the aspect of FIG. 6, protrusion of the other end surface (upper end surface) 214A of the via hole conductor 214 from the outermost diameter portion of the pixel electrode 212B (a portion of the pixel electrode 212B on the insulator 211 side), or the like can be suppressed. Here, when the other end surface 214A of the via hole conductor 214 protrudes from the pixel electrode 212B, a separation distance between the anode (outer periphery of the other end surface 214A of the via hole conductor 214) and the cathode (side surface of the first electrode layer 212) in a gas decreases, to thus possibly cause a change in the sensitivity (gas amplification factor) of the radiation detector 10 and easy occurrence of discharge. Further, in the aspect of FIG. 6, the angle formed by the side surface of the anode (pixel electrode 212B) and its flat surface (upper surface) and the angle formed by the side surface of the cathode (first electrode layer 212) and its flat surface (upper surface) each are an obtuse angle, and thus concentration of the electric field can be suppressed to make it difficult to cause the discharge.

In the aspect of FIG. 7, on the other hand, the angle formed by the side surface of the anode (pixel electrode 212B) and its flat surface (upper surface) and the angle formed by the side surface of the cathode (first electrode layer 212) and its flat surface (upper surface) are each formed to be acute. In the aspect of FIG. 7, although the other end surface 214A of the via hole conductor 214 protrudes from the pixel electrode 212B (outermost diameter portion of the pixel electrode 212B), the above-described angles are each acute and thereby concentration of the electric field occurs, resulting in that it is possible to improve the sensitivity (gas amplification factor) of the radiation detector 10.

<Manufacturing Method of a Radiation Detector>

There is explained a manufacturing method of the detection panel 21 in particular of the radiation detector 10 according to this embodiment.

Figure 8:
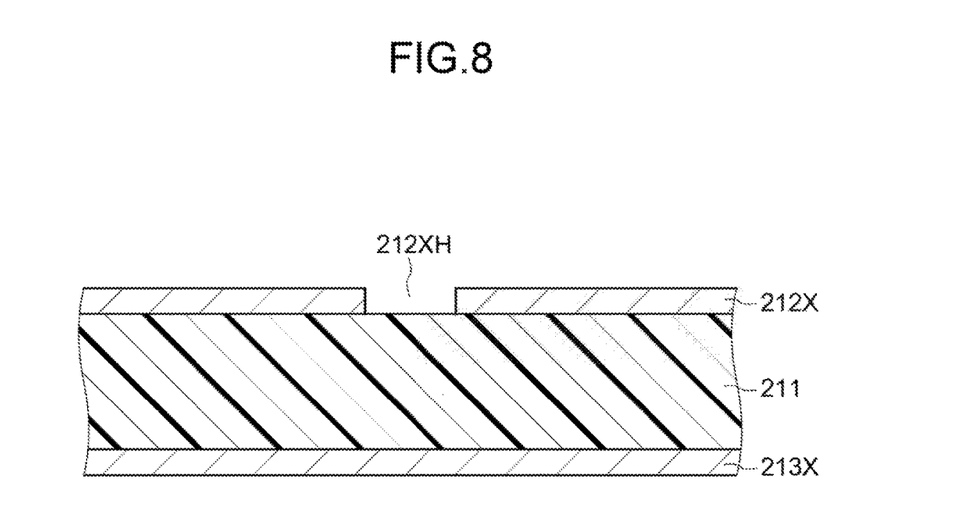
FIG. 8 It is a step view in a manufacturing method of the radiation detector according to this embodiment.
Figure 9:
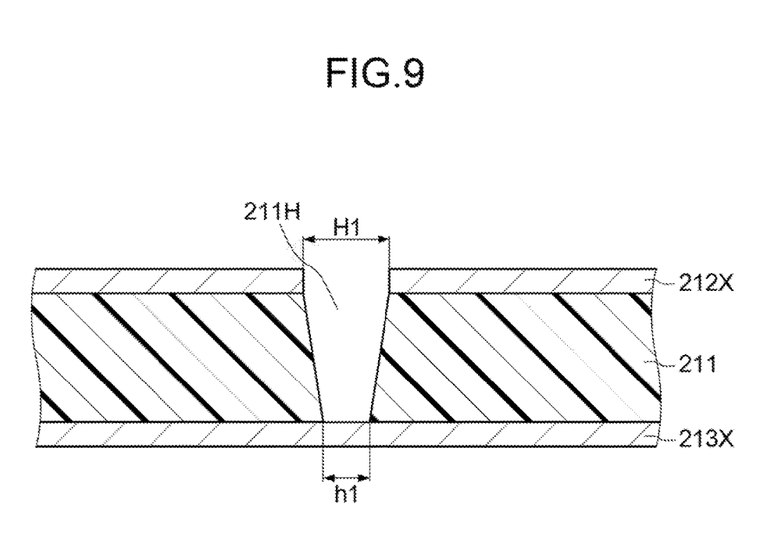
FIG. 9 It is a step view in the manufacturing method of the radiation detector according to this embodiment (view illustrating a first forming step).
Figure 10:
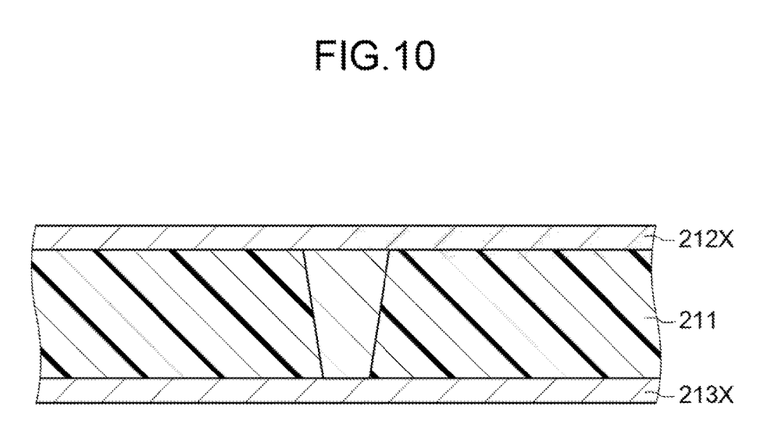
FIG. 10 It is a step view in the manufacturing method of the radiation detector according to this embodiment (view illustrating a second forming step).

FIG. 8 to FIG. 10 are step views relating to the manufacturing method of this embodiment, and the same reference numerals and symbols are used for the similar or same components in FIG. 1 to FIG. 3. Incidentally, FIG. 8 to FIG. 10 each are a cross-sectional view illustrating the pixel electrode periphery portion of the pixel-type radiation detector illustrated in FIG. 2 as an example (E-E cross section in FIG. 2) in an enlarged manner.

First, on the first surface 211A and the second surface 211B of the insulator 211 containing polyimide and a glass cloth, for example, as illustrated in FIG. 8, metal foils 212X and 213X are formed respectively, and an opening portion 212XH is formed in a predetermined portion of the metal foil 212X by etching or a laser.

Then, as illustrated in FIG. 9, an inverted truncated cone shaped through hole 211H is formed in the insulator 211 through the opening portion 212XH by using, for example, a $CO_2$ gas laser or UV-YAG laser. That is, there is performed a first forming step of forming the through hole 211H corresponding to the shape of the via hole conductor 214 in the interior of the insulator 211.

Incidentally, a ratio H1/h1 of a hole diameter H1 of the other end side (upper end portion) of the through hole 211H to a hole diameter h1 of one end side (lower end portion) of the through hole 211H is preferred to be 1.22 to 1.85 (1.22 or more and 1.85 or less) in the same manner as the ratio D1/d1 of the outer diameter D1 of the other end surface (upper end surface) 214A of the via hole conductor 214 to be formed to the outer diameter d1 of the one end surface (lower end surface) 214B of the via hole conductor 214 becomes 1.22 to 1.85 (1.22 or more and 1.85 or less).

Then, as illustrated in FIG. 10, electroless plating and electrolytic plating are performed in the through hole 211H of the insulator 211 to fill the through hole 211H, and the inverted truncated cone shaped via hole conductor 214 is formed inside the through hole 211H. That is, there is performed a second forming step of forming the via hole conductor 214 by performing via filling plating to fill the through hole 211H.

Then, the metal foil 212X increased in thickness by the above-described electroless plating and electrolytic plating is thinned to then be subjected to patterning, and thereby such a detection panel 21 as illustrated in FIG. 3 is manufactured.

Incidentally, although in the above-described concrete examples, the first electrode layer 212 and the second electrode layer 213 are formed of the metal foils 212X and 213X respectively, a structure can also be employed in which an insulator is applied onto a silicon substrate, for example, and the detection panel 21 is formed thereon. In this case, formation of the first electrode layer 212, the second electrode layer 213, and the like can be formed by utilizing a semiconductor process, and thus formation accuracy of these electrode layers improves.

In the foregoing, the present invention has been explained in detail based on the above-described concrete examples, but the present invention is not limited to the above-described concrete examples, and various variations and modifications may be made without departing from the scope of the present invention.

EXPLANATION OF REFERENCE NUMERALS

10 . . . radiation detector, 20 . . . pixel-type radiation detector (radiation detector main body), 21 . . . detection panel, 22 . . . electrode plate, 211 . . . insulator, 211H . . . through hole, 212 . . . first electrode layer, 212A . . . opening portion of first electrode layer, 212B . . . pixel electrode, 213 . . . second electrode layer, 214 . . . via hole conductor, 214A . . . other end surface (upper end surface) of via hole conductor, 214B . . . one end surface (lower end surface) of via hole conductor

The invention claimed is:

1. A radiation detector using gas amplification, comprising:
an insulator having a first surface and a second surface positioned at a back surface side of the first surface;
a first electrode layer that is provided on the first surface of the insulator and has a circular opening portion;
a pixel electrode positioned inside the opening portion;
a second electrode layer provided on the second surface of the insulator; and
a via hole conductor that has one end surface thereof bonded to the second electrode layer through the interior of the insulator and has the other end surface thereof bonded to the pixel electrode, wherein
at least a part of the other end surface side of the via hole conductor exhibits a column or truncated cone shape and an outer diameter of the via hole conductor becomes smallest at the one end surface.

2. The radiation detector using gas amplification according to claim 1, wherein
in the case where an outer diameter of the other end surface of the via hole conductor is set to D1 and an outer diameter of the one end surface of the via hole conductor is set to d1, D1/d1 is in a range of 1.22 or more and 1.85 or less.

3. The radiation detector using gas amplification according to claim 2, wherein
a relative permittivity of the insulator is 4.2 or more and 4.4 or less.

4. The radiation detector using gas amplification according to claim 3, wherein
the insulator contains polyimide and a glass cloth.

5. The radiation detector using gas amplification according to claim 1, wherein
a relative permittivity of the insulator is 4.2 or more and 4.4 or less.

6. The radiation detector using gas amplification according to claim 5, wherein
the insulator contains polyimide and a glass cloth.

7. A method of manufacturing a radiation detector using gas amplification being a method of manufacturing a radiation detector using gas amplification including: an insulator having a first surface and a second surface positioned at a back surface side of the first surface; a first electrode layer that is provided on the first surface of the insulator and has a circular opening portion; a pixel electrode positioned inside the opening portion; a second electrode layer provided on the second surface of the insulator; and a via hole conductor that has one end surface thereof bonded to the second electrode layer through the interior of the insulator and has the other end surface thereof bonded to the pixel electrode, the method comprising:
a first forming step of forming a through hole corresponding to a shape of the via hole conductor in the interior of the insulator; and
a second forming step of forming the via hole conductor by performing via filling plating to fill the through hole, wherein
at least a part of the other end surface side of the via hole conductor obtained by the first and second forming steps exhibits a column or truncated cone shape and an outer diameter of the via hole conductor becomes smallest at the one end surface.

8. The method of manufacturing the radiation detector using gas amplification according to claim 7, wherein
in the first forming step, the through hole corresponding to the shape of the via hole conductor is formed to make D1/d1 fall within a range of 1.22 or more and 1.85 or less in the case where an outer diameter of the other end surface of the via hole conductor is set to D1 and an outer diameter of the one end surface of the via hole conductor is set to d1.

9. The method of manufacturing the radiation detector using gas amplification according to claim 8, wherein
a relative permittivity of the insulator is set to 4.2 or more and 4.4 or less.

10. The method of manufacturing the radiation detector using gas amplification according to claim 9, wherein
the insulator contains polyimide and a glass cloth.

11. The method of manufacturing the radiation detector using gas amplification according to claim 7, wherein
a relative permittivity of the insulator is set to 4.2 or more and 4.4 or less.

12. The method of manufacturing the radiation detector using gas amplification according to claim 11, wherein
the insulator contains polyimide and a glass cloth.

13. A method of detecting radiation by a radiation detector using gas amplification being a method of detecting radiation by a radiation detector using gas amplification including: an insulator having a first surface and a second surface positioned at a back surface side of the first surface; a first electrode layer that is provided on the first surface of the insulator and has a circular opening portion; a pixel electrode positioned inside the opening portion; a second electrode layer provided on the second surface of the insulator; and a via hole conductor that has one end surface thereof bonded to the second electrode layer through the interior of the insulator and has the other end surface thereof bonded to the pixel electrode, wherein at least a part of the other end surface side of the via hole conductor exhibits a column or truncated cone shape and an outer diameter of the via hole conductor becomes smallest at the one end surface.

14. The method of detecting radiation by the radiation detector using gas amplification according to claim 13, wherein in the case where an outer diameter of the other end surface of the via hole conductor is set to D1 and an outer diameter of the one end surface of the via hole conductor is set to d1, D1/d1 is in a range of 1.22 or more and 1.85 or less.

15. The method of detecting radiation by the radiation detector using gas amplification according to claim 14, wherein a relative permittivity of the insulator is set to 4.2 or more and 4.4 or less.

16. The method of detecting radiation by the radiation detector using gas amplification according to claim 15, wherein the insulator contains polyimide and a glass cloth.

17. The method of detecting radiation by the radiation detector using gas amplification according to claim 13, wherein a relative permittivity of the insulator is set to 4.2 or more and 4.4 or less.

18. The method of detecting radiation by the radiation detector using gas amplification according to claim 17, wherein the insulator contains polyimide and a glass cloth.

* * * * *